United States Patent

[11] 3,624,033

[72] Inventors Henry W. Steinmann
Sparta;
Edward T. Pollard, Middlesex, both of N.J.
[21] Appl. No. 840,248
[22] Filed July 9, 1969
[45] Patented Nov. 30, 1971
[73] Assignee Celanese Corporation
New York, N.Y.

[54] LOW-TEMPERATURE PROCESS FOR THE
PRODUCTION OF POLYAMIDES
6 Claims, 1 Drawing Fig.
[52] U.S. Cl. .................................................. 260/47 CZ,
260/47 CP, 260/61, 260/65, 260/78 R
[51] Int. Cl. ........................................................ C08g 20/22,
C08g 33/04
[50] Field of Search ............................................ 260/47 CZ,
78, 65, 61, 47 CP

[56] References Cited
UNITED STATES PATENTS
2,831,834    4/1958   Magat .......................... 260/78
3,354,123   11/1967   Morgan ......................... 260/65

Primary Examiner—William H. Short
Assistant Examiner—L. L. Lee
Attorneys—Thomas J. Morgan, C. B. Barris and C. E. Miller ABSTRACT: Polyamides are rapidly produced at relatively low temperatures (e.g., ambient temperatures) by polymerization reaction of diamines with diacyl halides. An aqueous solution of a diammonium salt (e.g., a diamine dihydrohalide) and a solution of an equivalent amount of a diacyl halide (e.g., a diacyl chloride) in a water-immiscible solvent (e.g., methylene chloride) are intimately mixed at medium to high shear rate followed by the rapid addition, with continued agitation, of an aqueous solution of an amount of an acid-acceptor e.g., an alkali metal monocarboxylate) sufficient to liberate the diamine and neutralize the byproduct hydrogen halide.

TITRATION OF AQUEOUS SOLUTION OF 1,1-BIS(3-AMINO-4-HYDROXYPHENYL) CYCLOHEXANE WITH SODIUM HYDROXIDE

PATENTED NOV 30 1971                    3,624,033
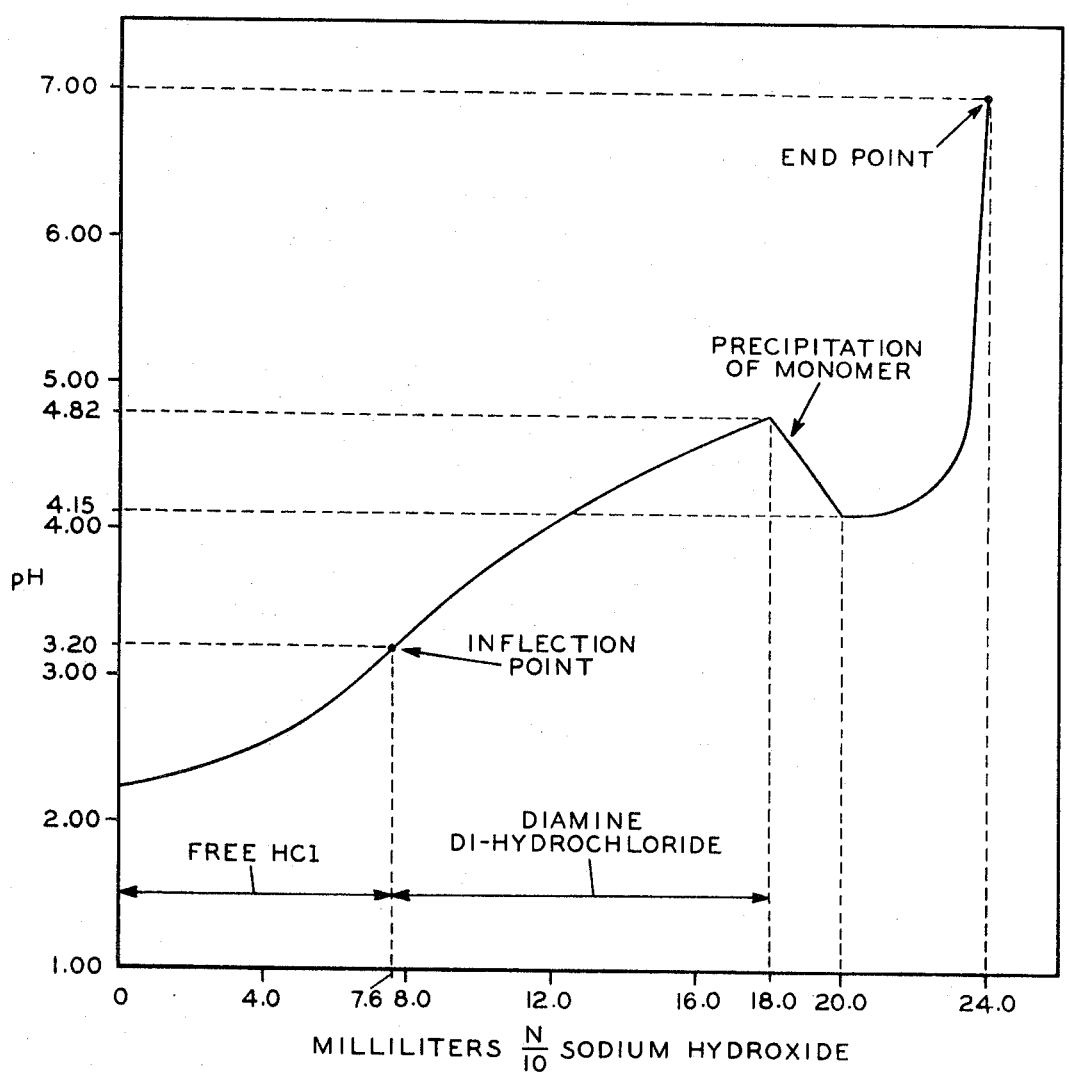
INVENTORS:
HENRY W. STEINMANN
EDWARD T. POLLARD
BY
*Charles E. Miller*
AGENT

LOW-TEMPERATURE PROCESS FOR THE PRODUCTION OF POLYAMIDES

This invention relates to the production of polyamides. More particularly, it relates to an improved low-temperature process for the production of high molecular weight polyamides by reaction of diamines with diacyl halides.

It is known that polyamides can be produced by melt-polymerization involving high temperatures, i.e., up to about 300° C. Such a process is generally useful for the production of nonaromatic polyamides, e.g., hexamethylene adipamide, polyepsilon-caproamide, and the like. On the other hand, high molecular weight, wholly aromatic polyamides, and, in particular, aromatic polyamides derived from relatively unstable precursors, cannot be commercially prepared by melt-polymerization techniques because the high temperatures involved cause undesirable side-reactions so that only highly colored, low molecular weight, and/or cross-linked products are obtained.

It has been suggested that polyamides can be produced at low temperatures, i.e., below about 100° C., and generally below about 50° C., by reacting a diamine with a diacyl halide. In particular, it has been proposed to effect such low-temperature polymerization by reacting the diamine and diacyl halide either in homogeneous solution or in a dual-phase system comprising mutually immiscible solutions of diamine and diacyl halide. However, these previously known low-temperature polymerization processes suffer serious disadvantages which detract from their usefulness in commercial-scale operations. Thus, with low-temperature polymerization methods involving homogeneous systems, the reaction conditions become highly critical. For example, such systems must be rigorously dry and the polymer product must be soluble in the solvent used. The latter requirement is important because certain polymers may not be soluble even though the corresponding monomers are soluble. Also, it may be that only low molecular weight polymer may be soluble, thereby preventing the formation of high molecular weight polymer due to precipitation of the growing polymer chains out of solution. Furthermore, reaction times for homogeneous low-temperature polymerization reactions are generally undesirably long, usually requiring several hours. Methods involving mutually immiscible solutions, on the other hand, require use of dual-solvent systems. Dual-solvent systems in which both phases are organic are expensive and require complicated recycling procedures when operating on a commercial scale in order to minimize the cost of production. On the other hand, those systems in which the diacyl halide is in a water-immiscible organic phase and the diamine is in aqueous phase, while more economical, have heretofore been inapplicable to that class of diamines which are of limited solubility in water of pH greater than about 6. This class includes practically all aromatic diamines. The reason for this is that the necessary diffusion processes that operate when the diamine component is soluble in the aqueous phase are not effective when the diamine component is substantially insoluble in the aqueous phase. In the latter case, the diamine is insolubly dispersed rather than dissolved in the aqueous phase, and, therefore, cannot diffuse rapidly enough to the aqueous-organic interface to react efficiently with the diacyl halide. As a result, dual-phase polymerizations employing an aqueous phase and an organic phase to give high molecular weight polyamides have been limited to diamines that are soluble in the aqueous phase. Furthermore, conventional low-temperature solution polymerizations, including those involving dual-solvent systems in which both phases are organic, require the isolation and purification of the diamine monomer prior to condensation thereof with the diacyl halide. This involves expensive and tedious recrystallization with the further problem of ensuring that a hydrate of the monomer is not formed. The requirement of recrystallization is particularly undesirable in cases where the diamine monomer is labile, such as exhibiting extreme sensitivity to heat, light, and/or oxidation, thereby requiring a constant blanket of dry nitrogen or helium during isolation and recrystallization.

Therefore, it is an object of the present invention to provide an improved process for the production of polyamides.

Another object is to provide an improved process for the production of wholly aromatic polyamides or polyamides derived from relatively unstable precursors by polymerization reaction between diamines and diacyl halides.

Another object is to provide an improved process for the production of highly pure, high molecular weight, wholly aromatic polyamides or polyamides derived from relatively unstable precursors by low-temperature polymerization reaction between diamines and diacyl halides.

Yet another object is to provide an improved process for the production of highly pure, high molecular weight, wholly aromatic polyamides or polyamides derived from relatively unstable precursors by low-temperature polymerization reaction between unstable and/or difficult-to-purify aromatic diamines and diacyl halides.

These and other objects as well as a fuller understanding of the present invention and the advantages thereof can be had by reference to the following detailed description and claims.

The above objects are achieved according to the present invention by contacting an aqueous solution of a diammonium salt with a solution of a diacyl halide in a water-immiscible solvent and then rapidly adding to the resultant two-phase system, which is kept in a state of vigorous agitation, an aqueous solution of a reagent (hereinafter called "acid-acceptor") which is capable of liberating the diamine from the corresponding diammonium salt and capable also of combining with the hydrogen halide byproduct of the reaction between the diamine and the diacyl halide. Polymerization occurs immediately without the need for a surfactant and results in the formation of a polyamide in high-yield (as determined by polymer weight), high-purity (as determined from infrared absorption measurements), and high molecular weight (as determined from measurements of inherent viscosity).

The process of the present invention is conducted at a temperature between about 5° C. and about 100° C., and preferably between about 10° C. and about 50° C., with ambient temperatures (i.e., temperatures between about 20° C. and about 30° C.) being especially preferred. The pressure employed is at least about 1 atmosphere, and preferably between about atmospheric pressure and autogenous pressure, with atmospheric pressure being especially preferred. The duration of the polymerization process of the present invention is between about 2 minutes and about 30 minutes, and preferably between about 5 minutes and about 15 minutes, with a duration of about 10 minutes being especially preferred. The products of the present invention are film- and fiber-forming polyamides whose maximum inherent viscosities are limited by the solubility of the polyamide in the reaction medium. Generally, the inherent viscosities of these polyamides lie in the range of between about 0.5 unit and about 2.5 units, and preferably between about 1 unit and about 1.5 units, with an inherent viscosity of about 1.2 units being especially preferred. Inherent viscosities reported herein are determined in a 0.1 percent by weight solution of the polyamide in N-methyl pyrrolidone at 25° C.

Without wishing the scope of the invention to be bound by theory, it is believed that the present process involves the instantaneous reaction between the acid-acceptor and diammonium salt which results in the liberation of free diamine at the interface between the aqueous phase and the water-immiscible phase. The ensuing acylation reaction between the diacyl halide and the free diamine at the aforementioned interface is so rapid that the diamine does not have time to precipitate unreacted away from the interface. In accordance with the above interpretation, it is possible to perform the manipulative steps of the present invention in rapid sequence, thereby securing the advantage of short processing times. The success of the present invention requires that the stoichiometry of the diacyl halide and diammonium salt be correct and that the acid-acceptor be preferably used stoichiometrically or in slight excess, otherwise there will be an excess of unreacted diacyl halide or free diamine which will contaminate the polyamide product, thereby necessitating subsequent "polymer cleanup" procedures which are expensive and time-consuming. Also, optimum results can be achieved according to the present invention if all "free acid" present in the aqueous phase containing the diammonium salt is neutralized, preferably with an acid-acceptor of the present invention (to be described more fully hereinbelow), or, alternatively, with aqueous alkali prior to polymerization. This feature of the invention is described in greater detail hereinbelow.

The present invention is suited to the production of polyamides from diamines which are insoluble in water or dilute alkaline solution, but which are relatively soluble when in the form of the corresponding diammonium salts. The invention is especially suited to the use of aromatic diamines, which, when reacted with aromatic diacyl halides according to the present process, result in the formation of wholly aromatic polyamides whose molecular structures are characterized by the recurring unit:

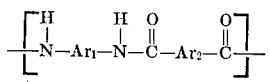

wherein $Ar_1$ and $Ar_2$ can be the same or different divalent unsubstituted aromatic moeities or divalent substituted aromatic moeities. It is not intended, however, to limit the scope of the present invention to diamines that are insoluble in water or dilute aqueous alkali. It is also intended to include water-soluble diamines, provided the corresponding diammonium salts are also soluble. In this regard, the present invention is especially suited for water-soluble diamines which tend to be unstable in neutral or dilute alkaline aqueous solution but which have reasonably good stability in water when in the form of the corresponding diammonium salts.

Diamines suitable for use in the present invention must be water-soluble in the form of diammonium salts. Such amines include preferably aromatic diamines of the formula:

wherein $Ar_1$ is a divalent aromatic moiety, i.e., it contains conjugated multiple bonds which exhibit resonance. $Ar_1$ preferably contains between about six and about 40 carbon atoms and can have single-ring, multiple-ring, or fused-ring structure. $Ar_1$ is further characterized by being unsubstituted or substituted with one or more substituents which are chemically compatible with (i.e., unreactive toward) the amino groups, and also not preferentially attacked by diacyl halides compared to —$NH_2$ under the conditions of the present process. Such substituents include lower alkyl, lower alkoxy, lower carbalkoxy, halogen, nitro, amino, sulfonyl, hydroxyl, and the like. The terms "lower alkyl," "lower alkoxy," and "lower carbalkoxy" as used herein denote substituents containing between one and about 10 carbon atoms.

Diamines which can be utilized to prepare wholly aromatic polyamides according to the present invention include single-ring aromatic diamines, e.g., metaphenylene diamine and lower alkyl-substituted metaphenylene diamines such as the methyl-, ethyl-, isopropyl-, n-butyl-, etc., metaphenylene diamines. A plurality of alkyl substituents can be attached to the aromatic ring as in the case of the dimethyl-, trimethyl-, tetramethyl-, diethyl-, triethyl-, triisopropyl-, etc., metaphenylene diamines. The alkyl substituents need not be the same because compounds such as 2-methyl-4-ethyl-metaphenylene diamine, 2-methyl-4-methyl-5-propyl-metaphenylene diamine, and the like, can be utilized. In place of alkyl substituents, the aromatic ring can be substituted with one or more lower alkoxy substituents such as in the case of the methoxy-, ethoxy-, isopropoxy-, n-butoxy-, etc., metaphenylene diamines. There can be more than one alkoxy substituent attached to the aromatic ring as in the case of the dimethoxy-, trimethoxy-, tetramethoxy-, etc., metaphenylene diamines. The alkoxy substituents need not be the same because compounds such as 2-methoxy-4-ethoxy-metaphenylene diamine and the like can be utilized. Halogen-substituted metaphenylene diamines such as the chloro-, bromo-, and fluoro-metaphenylene diamines can be utilized. A plurality of halogen substituents can be attached to the aromatic ring, and these halogen substituents can be the same or different. Other metaphenylene diamines which can be used include the nitro-, hydroxy, sulfonyl, and lower carbalkoxy-metaphenylene diamines. One or more of the latter substituents can be attached to the aromatic nucleus together with one or more lower alkyl, lower alkoxy or halogen substituents.

In addition to metaphenylene diamine and the substituted metaphenylene diamines specified above, the corresponding unsubstituted and substituted paraphenylene diamines can also be used.

In addition to the aforementioned single-ring aromatic diamines, multiple-ring and fused-ring aromatic diamines in which the amino groups are oriented meta- or para- with respect to each other are also useful in the present process. Examples of suitable multiple-ring aromatic diamines include 4,4'-diaminophenyl ether, 4,4'-diaminophenyl sulfone, 4,4'-diaminobiphenyl, 3,3'-diaminophenyl ether, 3,3'-diaminophenyl sulfone, 3,3'-diaminobiphenyl, and the like, and the corresponding diamines in which one or both of the aromatic rings contain one or more of a combination of the same or different lower alkyl, lower alkoxy, lower carbalkoxy, halogen, nitro, sulfonyl, hydroxyl, and the like substituents. Examples of fused-ring aromatic diamines include 1,4-diaminonaphthalene, 1,5-diaminonaphthalene, 2,6diaminonaphthalene and the like and corresponding compounds in which one or more of the aromatic rings contain one or more of a combination of lower alkyl, lower alkoxy, lower carbalkoxy, halogen, nitro, sulfonyl, hydroxyl, and the like substituents.

It is an advantageous feature of the present invention that aromatic diamines which are unstable even at ambient temperature and/or difficult to purify can be utilized. Notorious among such diamines are those containing hydroxyl substituents on the aromatic rings, and particularly those in which a hydroxyl substituent is ortho to an amino group. The present process is especially suited to the direct reaction of aromatic bis-aminophenols which are conveniently obtained directly in the form of relatively stable diammonium salts in aqueous solution without the need for isolation and recrystallization of the sensitive free diamine by the process disclosed in U.S. Pat. application Ser. No. 840,465 filed July 9, 1969 by Henry W. Steinmann et al. This aspect of the present invention is illustrated in example 1 hereinbelow.

Diamines suitable for use in the present invention are employed in the form of diammonium salts, desirably diammonium salts of strongly ionizable acids. Preferably, diammonium salts of mineral acids, e.g., sulfuric acid, nitric acid, hydrochloric acid, and the like, are employed. Procedures for preparing diammonium salts of diamines suitable for use in the present invention will be generally apparent to those skilled in the chemical art.

The concentration of diammonium salt in the aqueous phase is generally dependent on the solubility characteristics of each particular diammonium salt. Desirably, the concentration of diammonium salt in the aqueous phase lies in the range of between about 0.01 molar and about 1.0 molar, and preferably between about 0.1 molar and about 1.0 molar, with about 0.2 molar being especially preferred.

Diacyl halides suitable for use in the present invention are those which are soluble in inert, water-immiscible solvents, and which are capable of reacting with diamines to produce polyamides. In the production of wholly aromatic polyamides according to the present process, aromatic diacyl halides are used which have the following formula:

wherein $Ar_2$ is a divalent aromatic moiety, and X denotes a halogen substituent, i.e., chlorine, bromine, iodine, and fluorine, of which chlorine is preferred. $Ar_2$ preferably contains between about six and about 40 carbon atoms and can have single-ring, multiple-ring, or fused-ring structure. $Ar_2$ is further characterized by being unsubstituted or substituted with one or more substituents which are chemically compatible with, i.e., unreactive toward, the acyl halide substituents and also relatively unreactive toward the diamine compared to the acyl halide substituents under the conditions of the present process. Such substituents include lower alkyl, lower alkoxy, lower carbalkoxy, halogen, nitro, sulfonyl, and the like.

Aromatic diacyl halides which can be utilized to prepare the polyamides of the present invention are preferably diacyl chlorides which include isophthaloyl chloride and lower alkyl-substituted isophthaloyl chlorides such as the methyl-, ethyl-, isopropyl-, n-butyl, etc., isophthaloyl chlorides. A plurality of alkyl substituents can be attached to the aromatic ring as in the case of the dimethyl-, trimethyl-, tetramethyl-, diethyl-, triethyl-, triisopropyl-, etc., isophthaloyl chlorides. The alkyl substituents need not be the same because compounds such as 2-methyl-4-ethyl-isophthaloyl chloride, 2-methyl-4-methyl-5-propyl-isophthaloyl chloride, and the like, can be utilized. In place of alkyl substituents, the aromatic ring can be substituted with one or more lower alkoxy substituents such as in the case of the methoxy-, ethoxy-, propoxy-, butoxy-, etc., isophthaloyl chlorides. There can be more than one alkoxy substituent attached to the aromatic ring as in the case of the dimethoxy-, trimethoxy-, tetramethoxy-, etc., isophthaloyl chlorides. The alkoxy substituents need not be the same because compounds such as 2-methoxy-4-ethoxy-isophthaloyl chloride and the like can be utilized. Halogen-substituted isophthaloyl chlorides such as the chloro-, bromo-, and fluoro-isophthaloyl chlorides can be utilized. A plurality of halogen substituents can be attached to the aromatic ring, and these halogen substituents can be the same or different. Other isophthaloyl chlorides which can be used include the nitro-, sulfonyl-, and lower carbalkoxy-isophthaloyl chlorides. One or more of the latter substituents can be attached to the aromatic nucleus together with one or more lower alkyl, lower alkoxy or halogen substituents. Thus, it will be apparent that the aromatic radical of the isophthaloyl chloride can contain one or more or any combination of lower alkyl, lower alkoxy, lower carbalkoxy, halogen, nitro, sulfonyl, and the like unreactive substituents.

In addition to isophthaloyl chloride and the substituted isophthaloyl chlorides specified above, the corresponding unsubstituted and substituted terephthaloyl chlorides can also be used.

In addition to the aforementioned single-ring aromatic diacyl halides, multiple-ring and fused-ring aromatic diacyl chlorides in which the carbochloro substituents are oriented meta- or para- with respect to each other are also useful in the present process. Examples of suitable multiple-ring aromatic diacyl halides include 4,4'-dicarbochlorophenyl ether, 4,4'-dicarbochlorophenyl sulfone, 4,4'-dicarbochlorobiphenyl, 3,3'-dicarbochlorophenyl ether, 3,3'-dicarbochlorophenyl sulfone, 3,3'-dicarbochlorobiphenyl, and the like, and the corresponding diacyl chlorides in which one or both of the aromatic rings contain one or more of a combination of lower alkyl, lower alkoxy, lower carbalkoxy, halogen, nitro, sulfonyl, and the like substituents. Examples of fused-ring aromatic diacyl halides include 1,4-dicarbochloronaphthalene, 1,5-dicarbochloronaphthalene, 2,6-dicarbochloronaphthalene and the like and corresponding compounds in which one or more of the aromatic rings contain one or more of a combination of lower alkyl, lower alkoxy, lower carbalkoxy, halogen, nitro, sulfonyl, and the like substituents. Although the above examples of aromatic diacyl halides are presented specifically with respect to aromatic diacyl chlorides, it will be apparent that the corresponding diacyl bromides, diacyl fluorides, etc., are also suitable for use in the present invention.

The concentration of diacyl halide in the water-immiscible phase is generally dependent on the solubility characteristics of each particular diacyl halide. Desirably, the concentration of diacyl halide in the water-immiscible phase lies in the range of between about 0.01 molar and about 2.0 molar, and preferably between about 0.2 molar and about 2.0 molar.

Water-immiscible solvents suitable for use in forming the nonaqueous phase according to the present process include generally any water-immiscible solvent, preferably an organic solvent, capable of dissolving the diacyl halide without reacting therewith or otherwise interfering with the process. Such solvents include nonaromatic and aromatic (including unsubstituted and substituted nonaromatic and aromatic) liquid hydrocarbon solvents. Examples of unsubstituted and substituted aromatic hydrocarbon solvent include: benzene, toluene, ethyl benzene, xylenes, anisole, chlorobenzene, fluorobenzene, and the like. Example of unsubstituted and substituted nonaromatic hydrocarbon solvents include: n-hexane, isooctane, cyclohexane, cyclohexene, decalin, chlorocyclohexane, chloroform, methylene chloride, carbon tetrachloride, ethylene chloride, and the like. Other examples of water-immiscible solvents suitable for use in the present invention will readily suggest themselves to those skilled in the chemical art.

Acid acceptors suitable for use in the present invention are those which are water-soluble and capable of freeing the aromatic diamine from its diammonium salt. The acid acceptor must also be capable of reacting with the hydrogen halide which is formed as a byproduct of the reaction between the aromatic diamine and diacyl halide. Preferred acceptors are the alkali metal salts of monocarboxylic acids (including branched and straight-chain, saturated and unsaturated monocarboxylic acids) containing between one and about 20 carbon atoms per molecule. Examples of alkali metal salts of monocarboxylic acids suitable for use in the present process include lithium formate, sodium formate, potassium formate, lithium acetate, sodium acetate, potassium acetate, cesium acetate, sodium propionate, potassium propionate, cesium propionate, sodium butyrate, potassium butyrate, sodium decanoate, potassium palmitate, sodium oleate, sodium stearate, and the like. Especially preferred are the sodium and potassium salts of monocarboxylic acids containing between about two and about five carbon atoms, with sodium acetate being especially preferred.

The amount of acid acceptor used in the present process must be sufficient not only to release the diamine from the diammonium salt, but also to act as an acid acceptor when the liberated diamine reacts with the diacyl halide at the interface between the aqueous phase and the water-immiscible phase to form polyamide. In general, the amount of acid acceptor employed corresponds to at least about 1 mole of alkali metal monocarboxylate for every mole of ammonium substituent, acyl halide substituent, and free acid present in the aqueous diammonium salt phase. Preferably, an excess of between about 5 percent and about 15 percent of alkali metal monocarboxylate is employed, with an excess of about 10 percent being especially preferred. The acid acceptor can be added to the reaction system either in solid form or, more desirably, in aqueous solution. When added to the reaction system in aqueous solution, the acid acceptor is employed at a concentration of between about 0.5 molar and about 5.0 molar, and preferably between about 2 molar and 3 molar.

The yield of polyamide produced according to the present invention is optimized by a high rate of reaction. To achieve a high rate of reaction according to the present process, the diammonium salt should be neutralized and the free diamine liberated only at the interface between the aqueous phase and water-immiscible phase. To achieve this, the rate of diffusion of the diammonium salt to said interface is maximized, which is accomplished by conducting the polymerization under at least a moderately high degree of agitation, with higher degrees of agitation being preferred. In this way, an emulsion is formed in which the water-immiscible phase is dispersed in a continuous phase of aqueous solution. Suitable mixing means include any rapid and effective conventional mixer, or preferably, a high-shear mixer of the "Waring blender" type.

It is a feature of the present process that the relatively short reaction times permit the practice of the present invention on a continuous basis using conventional apparatus comprising separate conduits containing the aqueous phase, water-immiscible phase, and acid acceptor solution, respectively. Such conduits can be made to converge downstream into a high-shear mixing head of conventional design.

According to a preferred embodiment of the present invention, the dihydrochloride of a diamine is dissolved in water (which has been deoxygenated in the case of sensitive diamines; such deoxygenation being accomplished by conventional means, e.g., by sparing nitrogen through the system). The diacyl halide is dissolved in methylene chloride or some other suitable, water-immiscible solvent. The two solutions are mixed for a short period of time (preferably about 10 seconds) under an inert atmosphere, preferably nitrogen. Then an aqueous solution of sodium acetate is added all at once (preferably within less than 10 seconds). Polymerization takes place rapidly under continued agitation, and the reaction mixture thickens almost immediately. After about 5–10 minutes the reaction mixture is added to methanol or other solvent capable of precipitating the polymer, which is collected by filtration and washed, preferably with water and methanol. The resulting polyamide is conveniently dried under mild conditions e.g., 30°–50° C. in vacuo. It is preferred to use an excess of sodium acetate to ensure complete removal of hydrogen chloride. Generally, an excess, preferably a 5 to 15 percent excess, is used over that required to generate the free diamine monomer from its dihydrochloride and react with the hydrogen chloride evolved in the polymerization reaction. Higher inherent viscosities of the resulting polymers are generally obtained when using a 5–15 percent excess of sodium acetate as compared to the stoichiometric amount thereof. It is also preferred to use a volume ratio of aqueous phase to organic phase in the range of between about 1:2 and 3:1. It is especially preferred to use a volume ratio of aqueous phase to organic phase of about 2:1.

As mentioned above, stoichiometry control is an important factor in achieving high molecular weight polymers. If a pure diamine monomer is dissolved in deoxygenated water containing an acid such as hydrochloric acid and then this solution used directly the stoichiometry is determined simply by the weight of pure diamine monomer used. However, if the diamine monomer requires further purification e.g., an activated carbon treatment) and/or is obtained as a derivative without isolation such as from the reduction of the corresponding dinitro derivative, according to the above-mentioned U.S. Pat. application Ser. No. 840,465, it is preferred to determine the exact amount of diamine monomer in the aqueous solution (present as the dihydrochloride). This procedure is especially useful when handling sensitive diamines, e.g., the bis-aminophenols. The amount or concentration of the dihydrochloride of the diamine monomer is determined by conventional analytical techniques, e.g., by removing an aliquot and titrating with aqueous alkali using a pH meter to determine the inflection point and the end point. The inflection point arises from the fact that the solution may contain free hydrochloric acid in addition to the dihydrochloride of the diamine monomer. The reason for this is that a slight excess of hydrochloric acid must be used when forming the dihydrochloride of the diamine to assure complete formation of same. The inflection point represents the point at which the free HCl has been neutralized. The titration from the inflection point to the end point (PH 7) gives the amount of dihydrochloride of the diamine monomer. Knowing this for the aliquot, one can determine the amount of diamine monomer present in the solution for polymerization and the amounts of diacyl chloride and sodium acetate required for the polymerization reaction. It is preferred to neutralize all of the free hydrochloric acid in order to achieve high molecular weight polyamides.

The present invention is further illustrated by way of the following examples.

EXAMPLE 1

Reaction of 1,1-bis(3-amino-4-hydroxyphenyl) cyclohexane with terephthaloyl chloride To a solution of 40.0 grams (1.00 mols) of sodium hydroxide in 1,800 milliliters of water are added 21.48 grams (0.06 mole) of 1,1-bis(3-nitro-4-hydroxyphenyl)cyclohexane. To the resultant red-colored solution is rapidly added a solution of 210 grams of sodium hydrosulfite in 1,800 milliliters of water with stirring. The reaction mixture becomes almost colorless within about 10 to 15 minutes. A volume of 35 milliliters 4 N hydrochloric acid is slowly added to the reaction mixture to precipitate the 1,1-bis(3-amino-4-hydroxyphenyl)cyclohexane as a white, flocculent solid. The pH of the supernatant liquid is about 7.2; all of these manipulations are conducted under oxygen-free conditions. The precipitate is collected under an atmosphere of nitrogen and washed thoroughly with deoxygenated water. It is then dissolved in 540 milliliters of deoxygenated 0.31 N hydrochloric acid. About 5 grams of decolorizing carbon are added and a stream of nitrogen is bubbled through the black suspension for about 30 minutes to expel any hydrogen sulfide and sulfur dioxide from the system. The suspension is filtered in an atmosphere of nitrogen and the volume of the colorless filtrate is brought up to 600 milliliters with deoxygenated water.

A 10 milliliter portion (i.e., a 1/60th aliquot) of the solution is diluted to about 100 milliliters with distilled water and titrated with 0.1 N sodium hydroxide using a pH meter. The following readings are taken, a plot of which is shown in the accompanying drawing:

| Milliliters of N/10 Sodium Hydroxide Added | pH |
|---|---|
| 0.0 | 2.21 |
| 1.0 | 2.28 |
| 3.0 | 2.42 |
| 5.0 | 2.65 |
| 7.0 | 3.04 |
| 7.1 | 3.08 |
| 7.2 | 3.10 |
| 7.4 | 3.15 |
| 7.5 | 3.18 |
| 7.6 | 3.20 |
| 7.7 | 3.21 |
| 7.8 | 3.23 |
| 8.0 | 3.29 |
| 10.0 | 3.73 |
| 12.0 | 4.08 |
| 14.0 | 4.33 |
| 16.0 | 4.60 |
| 18.0 | 4.82 |
| 20.0 | 4.15 |
| 21.0 | 4.18 |
| 22.0 | 4.22 |
| 23.0 | 4.46 |
| 23.5 | 4.85 |
| 23.7 | 5.26 |
| 23.9 | 6.25 |
| 24.0 | 7.15 |

With reference to the drawing, computerized data from six other titration runs show that the inflection point occurs at a pH of 3.20. The corresponding volume of 7.6 milliliters of N/10 sodium hydroxide represents the amount of free hydrochloric acid in the solution. As additional sodium hydroxide is added, the dihydrochloride of the diamine monomer becomes neutralized. When about half the dihydrochloride is neutralized, the monomer precipitates from solution, accompanied by a sudden decrease in the pH over the range covered by 18.0 to 20.0 milliliters of N/10 sodium hydroxide. Thereafter, the neutralization is heterogeneous. When all the dihydrochloride is neutralized, the pH rises sharply to the endpoint pH of 7.0 of about 24.0 milliliters of N/10 sodium hydroxide. From the results depicted in the drawing, the amount of diamine dihydrochloride monomer is given as (24.0–7.6) (0.1) milliequivalents = 1.64 milliequivalents or 0.82 millimoles. Since the aliquot is a one-sixtieth aliquot, then the original solution contains 60×0.82=

49.2 millimoles or 0.0492 mole. Of course, when computing the amount of terephthaloyl chloride for use in the polymerization, it is necessary to take into account the aliquot that was removed.

The free hydrochloric acid in the original solution is next neutralized with a stoichiometric amount of sodium acetate. The solution is then placed in a Waring-type blender together with a solution of 9.824 grams (0.0484 mole) of terephthaloyl chloride in about 300 milliliters of methylene chloride and the mixture agitated for 10 seconds in an atmosphere of nitrogen. A volume of 93 milliliters of 2.3 M sodium acetate solution is then added all at once, and agitation of the resultant thick reaction mixture is continued for an additional 10 minutes. The reaction mixture is added to methanol and the white, granular polyamide product is collected and washed thoroughly with water and methanol and then dried in vacuo at about 30° C. The yield of dried polyamide is 20.7 grams (100 percent of theory based on the diamine or terephthaloyl chloride). The infrared spectrum of the product shows a strong absorption band at 6.05 microns (corresponding to the amide carbonyl group). No absorption occurs at 5.85 microns (corresponding to an ester carbonyl group). The structure of the polyamide consists of recurring units having the following formula:

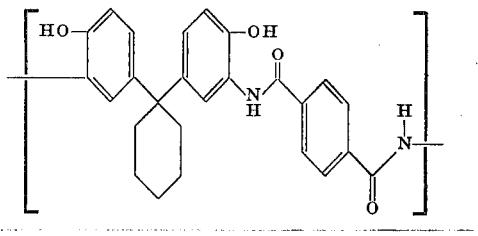

The polyamide is soluble in a variety of solvents, e.g., N,N-dimethylacetamide, N-methylpyrrolidone, hexamethylphosphoramide, and the like. The inherent viscosity is 1.20 deciliters per gram as measured in a 0.1 percent by weight solution in N-methylpyrrolidone (NMP) at 25° C. When the polymer is observed under a hot stage microscope, it does not soften or melt below 380° C. Fibers and films are readily formed from solutions (i.e., "dopes") of the polymer in N,N-dimethylacetamide.

EXAMPLES 2–8

Following essentially the same procedure used in example 1, various polyamides are produced. The conditions and results of these runs are summarized in table I.

The foregoing examples are presented for the purpose of illustrating the present invention without limiting the scope thereof. It will be recognized that changes and variations can be made in the materials and procedures used in those examples without departing from the spirit of the invention and purview of the following claims.

We claim:

1. A process for producing polyamides by reaction of diamines with diacyl halides comprising:
   a. forming an aqueous solution of a dimineral acid salt of a diamine;
   b. forming a solution of a diacyl halide in an inert, water-immiscible solvent, said diacyl halide being used in an amount which is stoichiometrically equivalent to the amount of diamine used in step (a);
   c. contacting the solution formed in step (a) with the solution formed in step (b) to form a two-phase system;
   d. performing step (c) for less than about 10 seconds with vigorous agitation to form an emulsion of water-immiscible phase dispersed in a continuous phase of aqueous solution;
   e. adding to the emulsion formed in step (d) an alkali metal salt of a monocarboxylic acid containing between one and 20 carbon atoms per molecule in an amount suffi- TABLE I.—PRODUCTION OF POLYAMIDES BY LOW-TEMPERATURE REACTION BETWEEN DIAMINES AND DIACYL CHLORIDE

| Example No. | Diamine | Diacyl chloride | Polyamide product (recurring unit) | Infra-red spectrum (amide carbonyl) | Melting point (°C.) | Inherent viscosity |
|---|---|---|---|---|---|---|
| 2 | 1,1-bis(3-amino-4-hydroxyphenyl) cyclohexane | Isophthaloyl chloride | Poly(1,1-cyclohexane-bis(4-hydroxy-3-phenyl)isophthalamide) | 6.05 | 285–295 | 1.55 |
| 3 | 2,2-bis(3-amino-4-hydroxyphenyl) propane | Terephthaloyl chloride | Poly(2,2-propane-bis(4-hydroxy-3-phenyl)terephthalamide) | 6.05 | >375 | 0.93 |

| Example No. | Diamine | Diacyl chloride | Polyamide product (recurring unit) | Infra-red spectrum (amide carbonyl) | Melting point (°C.) | Inherent viscosity |
|---|---|---|---|---|---|---|
| 4 | (H₃C, CH₃)-bridged bis(amino-hydroxyphenyl) propane | ClOC—C₆H₄—COCl | [—structure—] | 6.05 | 295–300 | [1] 1.30 |
| 5 | aniline (H₂N—C₆H₄—NH₂) | ClOC—C₆H₄—COCl | Poly(2,2-propane-bis(4-hydroxy-3-phenyl)isophthalamide) | 6.05 | [2] >300 | [1] 0.79 |
| 6 | Meta-phenylene diamine | Isophthaloyl chloride | Poly(meta-phenylene isophthalamide) | 6.05 | >375 | [3] 0.98 |
| 7 | 3,3′-diaminobenzidine | Isophthaloyl chloride | Poly-(3,3′-diamino-4,4′-biphenylene)isophthalamide | 6.05 | 375 | [3] 0.68 |
| 8 | Benzidine plus Bis(3-amino-4-hydroxyphenyl) sulfone | Isophthaloyl chloride | Poly-4,4′-biphenylene isophthalamide Copolyamide | 6.05 | 372–375 | [1] 0.96 |

[1] Measured in a 0.1% solution in N-methylpyrrolidone at 25° C.
[2] Measured in a 0.1% solution in concentrated H₂SO₄ at 25° C.
[3] Decomposes.

cient to liberate the diamine from the disalt thereof and to neutralize the hydrogen halide byproduct of the reaction between the diamine and diacyl halide; and f. conducting the addition step in (e) at at least atmospheric pressure for a period of time of less than about 5 seconds with maintenance of vigorous agitation at a temperature of from about 5° to 100° C. for a total reaction time of from about 2 to 30 minutes.

2. A process according to claim 1 wherein:

the dimineral acid salt of the diamine is an aromatic diammonium salt of sulfuric acid, nitric acid, or hydrochloric acid;

the diacyl halide is an aromatic diacyl chloride;

the inert, water-immiscible solvent used in step (b) is benzene, toluene, cyclohexane, chloroform, or methylene chloride;

the amount of monocarboxylic acid, alkali metal salt used is between about 5 percent and about 15 percent in excess of that required in step (e).

3. A process according to claim 2 wherein:

the concentration of the dimineral acid salt of the diamine in the aqueous solution formed in step (a) is between about 0.01 molar and about 1.0 molar;

the concentration of the diacyl halide in the solution formed in step (b) is between about 0.01 molar and about 2.0 molar;

the monocarboxylic acid, alkali metal salt is added in step (e) in the form of an aqueous solution having a concentration of between about 0.5 molar and about 5.0 molar.

4. A process according to claim 3 wherein:

the dimineral acid salt of the diamine is an aromatic diammonium chloride;

the inert, water-immiscible solvent used in step (b) is methylene chloride;

the monocarboxylic alkali metal salt is an alkali metal acetate; and the amount of said acid acceptor used is about 10 percent in excess of that required in step (e).

5. A process according to claim 4 wherein:

the concentration of the dimineral acid salt of the diamine in the aqueous solution formed in step (a) is between about 0.1 molar and about 1.0 molar;

the concentration of the diacyl halide in the solution formed in step (b) is between about 0.2 molar and about 2.0 molar;

the monocarboxylic acid alkali metal salt is added in step (e) in the form of an aqueous solution having a concentration of between about 2 molar and about 3 molar;

steps (c), (d), and (e) are performed at a temperature of between about 10° C. and about 50° C.; and steps (c), (d), and (e) are performed at a pressure of between about 1 atmosphere and autogenous pressure.

6. A process for producing polyamides by reaction of diamines with diacyl halides comprising:

a. forming an aqueous solution of a dimineral acid salt of a diamine selected from the group consisting of a dihydrochloride salt of 1,1-bis(3-amino-4-hydroxy phenyl) cyclohexane; 2,2-bis(3-amino-4-hydroxyphenyl) propane; metaphenylenediamine; benzidine; 3,3'-diaminobenzidine; and bis(3-amino-4-hydroxyphenyl) sulfone; the concentration of the dimineral acid salt in the aqueous solution formed in step (a) is about 0.2 molar;

b. forming a solution of a diacyl halide selected from the group consisting of terephthaloyl chloride and isophthaloyl chloride in methylene chloride; the concentration of the diacyl halide in the solution formed in step (b) is about 1.6 molar;

c. contacting the solution formed in step (a) with the solution formed in step (b) to form a two-phase system;

d. performing step (c) for less than about 10 seconds with vigorous agitation to form an emulsion of water-immiscible phase dispersed in a continuous phase of aqueous solution;

e. adding to the emulsion formed in step (d) sodium acetate in the form of an aqueous solution having a concentration of about 2.3 molar; and f. conducting the addition step in (e) at atmospheric pressure for a period of time less than about 5 seconds with vigorous agitation in a Waring blender at a temperature of from about 20° C. to about 30° C.

* * * * *

UNITED STATES PATENT OFFICE
CERTIFICATE OF CORRECTION

Patent No. 3,624,033            Dated November 30, 1971

Inventor(s) Henry W. Steinmann and Edward T. Pollard

It is certified that error appears in the above-identified patent and that said Letters Patent are hereby corrected as shown below:

Column 13, line 35, insert --acid-- after "monocarboxylic"

Column 13, line 37, delete "said acid acceptor" after "of" and insert --monocarboxylic acid, alkali metal salt--

Signed and sealed this 30th day of May 1972.

(SEAL)
Attest:

EDWARD M. FLETCHER, JR.            ROBERT GOTTSCHALK
Attesting Officer                  Commissioner of Patents